US012657120B2

(12) United States Patent
Thomas et al.

(10) Patent No.: US 12,657,120 B2
(45) Date of Patent: Jun. 16, 2026

(54) MULTICLOUD TEST AUTOMATION FRAMEWORK

(71) Applicant: Bank of America Corporation, Charlotte, NC (US)

(72) Inventors: Roshin Jacob Thomas, Addison, TX (US); Thresiamma Louis, Charlotte, NC (US); Tonya Kyra Miller, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 182 days.

(21) Appl. No.: 18/377,849

(22) Filed: Oct. 9, 2023

(65) Prior Publication Data

US 2025/0117315 A1 Apr. 10, 2025

(51) Int. Cl.
*G06F 11/3698* (2025.01)
*G06F 11/34* (2006.01)
*G06F 11/3668* (2025.01)

(52) U.S. Cl.
CPC ...... *G06F 11/3698* (2025.01); *G06F 11/3476* (2013.01); *G06F 11/3688* (2013.01)

(58) Field of Classification Search
CPC ............. G06F 11/3688; G06F 11/3698; G06F 11/3684; G06F 11/3475
See application file for complete search history.

(56) References Cited

U.S. PATENT DOCUMENTS

| | | | |
|---|---|---|---|
| 11,348,095 B2 | 5/2022 | Fletcher et al. | |
| 11,551,212 B2 | 1/2023 | Malhotra et al. | |
| 2008/0209275 A1* | 8/2008 | Kwan ................. | G06F 11/3688 |
| | | | 714/38.14 |
| 2020/0278920 A1* | 9/2020 | Khakare ................... | G06F 8/61 |
| 2021/0097532 A1 | 4/2021 | Mahasuverachai | |
| 2023/0224176 A1 | 7/2023 | Tsiatsikas | |
| 2023/0325298 A1* | 10/2023 | Mohan ................ | G06F 11/3612 |
| | | | 717/126 |
| 2024/0012738 A1* | 1/2024 | Tiwari ................ | G06F 11/3698 |

* cited by examiner

*Primary Examiner* — Duy Khuong T Nguyen
(74) *Attorney, Agent, or Firm* — Weiss & Arons LLP

(57) ABSTRACT

Systems, methods, and apparatus are provided for a secure multicloud test automation framework. The automation framework may receive a natural language request for a cloud-based test scenario at a user interface on an enterprise network. The test scenario may include a cloud resource and a cloud platform. Machine learning may map keywords extracted from the test scenario to a set of test cases associated with the cloud resource. Keyword mapping may also identify a configuration file associated with the cloud platform. The automation framework may retrieve shell scripts specified by the set of test cases from a shell script repository. The automation framework may use data from the configuration file to access the cloud platform via a secure gateway and execute the shell scripts using data from the cloud platform. The automation framework may generate a comprehensive summary report and maintain technical logs for the test.

19 Claims, 4 Drawing Sheets

MULTICLOUD TEST AUTOMATION FRAMEWORK

FIELD OF TECHNOLOGY

Aspects of the disclosure relate to multicloud IaaS validation using natural language processing.

BACKGROUND OF THE DISCLOSURE

An enterprise may replace a physical data center with cloud-based resources for efficiency, scalability, cost savings, or for any other reason. An Infrastructure-as-a-Service (IaaS) model may replicate the data center infrastructure with public or private cloud-based resources for storage, networking, and security.

The enterprise may validate deployment of cloud-based resources to ensure the integrity and security of enterprise data and to comply with regulatory requirements. Conventionally, validation of cloud-based resources requires manual selection of each individual test case as well as manual input to direct execution of test scripts on the cloud platform. In a multicloud system each cloud platform may require proprietary protocols.

It would be desirable to provide a test automation framework capable of automated execution of test scripts. It would be desirable to enable the test automation framework to function in a multicloud environment. Specifically, it would be desirable for the automation framework to receive a natural language test scenario, map the scenario to the relevant test cases, and execute the test scripts on the appropriate cloud platform.

It would further be desirable to integrate test results across platforms and generate a summary report for a business user.

SUMMARY OF THE DISCLOSURE

Systems, methods, and apparatus are provided for a secure multicloud test automation framework.

The automation framework may receive a natural language request for a cloud-based test scenario at a user interface on an enterprise network. The test scenario may include a cloud resource and a cloud platform.

A machine learning model may include both extraction and mapping algorithms. Machine learning may map keywords extracted from the test scenario to a set of test cases associated with the cloud resource. Keyword mapping may also identify a configuration file associated with the cloud platform.

The automation framework may retrieve shell scripts specified by the set of test cases from a shell script repository. The automation framework may use data from the configuration file to access the cloud platform via a secure gateway. In some embodiments, the security level of the gateway may be tuned based on the test cases and the platform provider.

The automation framework may execute the shell scripts using data from the cloud platform. The automation framework may generate a comprehensive summary report for the test. The automation framework may maintain technical logs for the test.

The invention is a practical application that provides a unified framework for validating cloud resources across multiple public and private cloud providers. Natural language processing may convert a user input into an actionable validation scenario in real time. The automation framework may integrate results across cloud providers into a comprehensive and easily understandable summary report.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
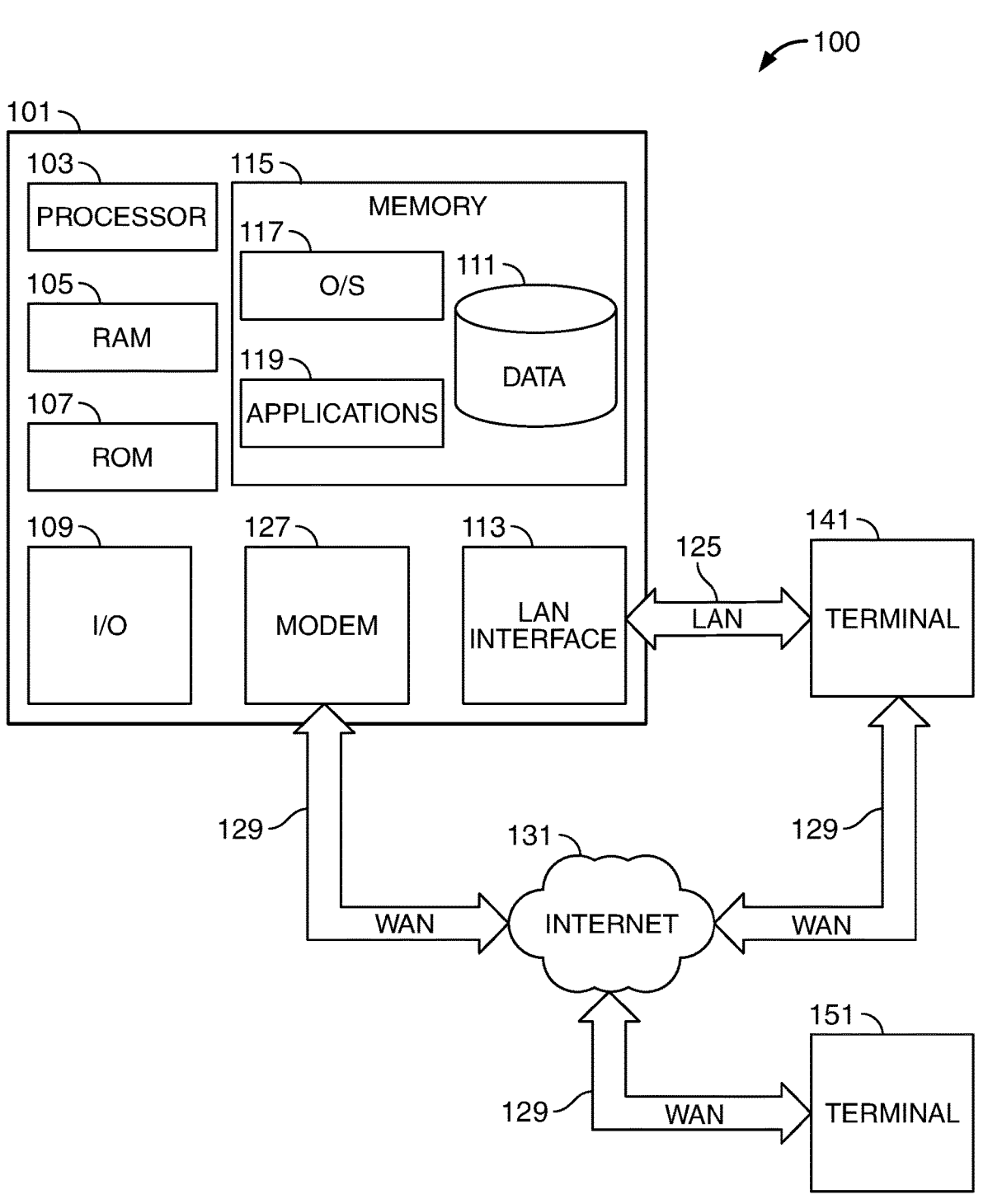
FIG. 1 shows illustrative apparatus in accordance with principles of the disclosure.

Systems, methods, and apparatus are provided for a secure multicloud validation framework.

Validation typically involves test scenarios, test cases, and test scripts. A test scenario may be understood as a high-level determination of what is to be tested. In a simple illustrative example, a security-oriented test scenario may verify that only registered users may log into a website. In some cases, a test scenario may encompass an end-to-end review of a cloud-based process.

Test cases detail the specific steps for how the testing is to be accomplished. The high-level test scenario may be broken down into a set of specific actions that each has an expected outcome. These actions may be independent of each other or may be a series of progressive steps. With regard to the simple login test scenario above, one action might be that when a user tries to open a login window, the window opens. A second action might be that when a user enters a valid username and password, the application launches. A third action might be that when a user enters a valid username with an invalid password, the application does not launch. The functionality of each of these individual actions may be evaluated with separate test cases.

Each test case may be associated with one or more test scripts. The test scripts may be computer executable code that implements the test case in a machine environment.

Infrastructure-as-a-service (IaaS) is a cloud computing model that allows an enterprise to replace a physical data center with cloud-based resources. The IaaS vendor may provide computer resources such as processing, storage, and networks in a cloud environment. The enterprise may deploy and run applications using this virtual infrastructure.

In a multicloud environment, the enterprise may use cloud computing services from more than one provider to run its applications. This arrangement may enable the enterprise to choose the best computing environment for each workload. A multicloud strategy also enables the organization to take advantage of new technologies without being limited to the offerings of a single cloud provider.

The multicloud environment may include public clouds, private clouds, or a combination of both. Public clouds may reduce overhead costs and enable the organization to scale up or down as its needs change.

One challenge of a multicloud environment involves maintaining consistent performance, security, and regulatory compliance across clouds. Each cloud may include different architecture patterns, technologies, and network configurations.

A test automation framework may enable the enterprise to test the cloud-based infrastructure and ensure it complies with business standards. A multicloud test automation framework may be able to quickly apply targeted, consistent testing across multiple cloud environments.

The automation framework may access pre-coded components for reading test data, reading configuration files, selecting required test cases, executing test cases, and generating a summary report. The automation framework may receive a high-level test scenario and execute the test without user intervention.

For the sake of illustration, the invention will be described as being performed by a "system." The system may include one or more features of apparatus and methods that are described herein and/or any other suitable device or approach.

The system may include a test automation framework. The test automation framework may validate infrastructure objects deployed in different cloud environments.

The test automation framework may include a user interface. A user may input a testing request. The request may be a test scenario. The user may enter the test scenario using natural language.

The automation framework may use machine learning algorithms for natural language processing. The machine learning algorithms may include named entity recognition or any suitable keyword extraction algorithm. The automation framework may tokenize the natural language test scenario.

The system may access a natural language processing (NLP) library. The NLP library may be an open-source library or any suitable repository. The system may use the NLP library to tokenize and analyze the input. Using a library may enable the system to function without multiple cycles of training.

The automation framework may use one or more mapping algorithms in conjunction with the extraction algorithms. The automation framework may include a test case mapper. The test case mapper may map the natural language request to one or more test cases.

Conventionally, test cases must be manually entered and run one by one. In contrast, the automation framework may use NLP-based mapping to automatically identify the required test cases for a scenario. The automation framework may conserve resources by executing only that limited set of cases.

The automation framework may iterate through the tokens to identify keywords related to cloud resources. For example, the natural language request may include the term "storage account." The automation framework may map keywords to one or more test cases. The automation framework may select the test cases from a test case repository.

The automation framework may iterate through the tokens to identify associated keywords with a cloud provider. Illustrative cloud providers include Amazon Web Services™ (AWS), Google Cloud Platform™ (GCP), and Microsoft Azure™. The automation framework may map the keywords to a configuration file associated with a cloud provider.

The automation framework may read the configuration file. The configuration file may include a cloud service access point or uniform resource locator (URL) for the provider. The configuration file may include encrypted keys or authentication tokens for authorization with the cloud provider. The configuration file may include subscription details.

The configuration file may identify a level of security to be applied for test execution. The level of security may be dependent on the cloud platform. The level of security may be dependent on the set of test scripts to be executed. The level of security may be adjusted or tuned for each test. The level of security may determine one or more parameters associated with the enterprise connection to the cloud platform.

The configuration file may include routing information. The routing information may specify a gateway for connection to the cloud platform. The routing information may be associated with proprietary provider hardware that has a dedicated connection to the cloud platform.

The automation framework may determine the level of testing required. For example, a smoke test may include preliminary testing to reveal simple failures and may take only a short amount of time. More comprehensive or more granular testing may require much longer periods of time. An execution count may refer to the number of test executions during the run. The flexibility provided by a natural language request enables a user to provide a high-level test scenario in real time. Based on the scenario, the automation framework may use these instructions to specify an execution count at runtime.

Each test case in the test case inventory may identify a shell script. Shell scripts may contain the logic to create and validate resources. In many cases, each public cloud provider may use a propriety language. Using shell language for the test scripts allows for cross-compatibility across multiple different cloud platform providers.

The automation framework may access the shell scripts. The test case inventory may contain the names of individual shell scripts to be executed. The shell scripts may be stored in a repository. The repository may be any suitable repository for storing and managing code, such as Git™ or BitBucket™. The repository may be cloud based. The automation framework may retrieve the shell scripts from the repository.

The automation framework may execute the shell scripts. The automation framework may execute the retrieved shell scripts using cloud-based data on the cloud platform. The system may generate a summary report that includes the test results. Illustrative summary report content may include the test case name, test case description, execution status of each test case (i.e. pass/fail), an error log in case of failed test cases, execution date, and/or environment (i.e. production, testing etc.).

The automation framework may generate technical logs that detail each step of the execution. The technical logs may show the return for each line of the script as it is executed. Conventional monitoring tools and logs use rigid systems that are specific to a cloud platform. In contrast, the automation framework may generate diagnostic logs across a multicloud environment. These features may ensure compliance with regulatory and privacy requirements across different platforms and providers.

The summary report may consolidate test results from multiple platforms. Conventionally, test status reports may be limited to individual technical logs from each cloud platform. In contrast, the automation framework may separate out the technical logs and generate a single business report that summarizes all the test results and is easily comprehensible.

In some embodiments, the automation framework may provide an interim report. In some embodiments, the automation framework may provide access to early test results. The automation framework may enable a user to decide whether to continue testing.

The automation framework may determine if a resource deployed on the cloud platform is functional. The automation framework may determine if all security parameters are satisfied. For example, the automation framework may determine that encryption is operating or that all endpoints are private with no public IP addresses. The multicloud framework ensures that the enterprise can provide standardized validation protocols regardless of the provider and can ensure compliance with all internal policies across multiple platforms.

The automation framework may be stored on an enterprise server. In some embodiments, the automation framework may be downloaded and stored locally on a user device. In some embodiments, the automation framework may be stored centrally and accessed through an internal enterprise network.

The automation framework may be developed in a modular way. A new cloud platform may be added without disrupting the existing framework. The automation framework may be adapted to add a new cloud platform by incorporating a new configuration file and/or new routing hardware. The automation framework may be integrated with an application development pipeline for unattended iterated executions at various development stages.

As set forth above, the automation framework may receive a test scenario from a user. In some embodiments, an AI-based multicloud testing system may be configured using machine learning to independently generate test scenarios and/or test cases. The automation framework may apply the protocols set forth above to automatically execute the AI-generated test cases on the correct cloud platform.

One or more non-transitory computer-readable media storing computer-executable instructions are provided. When executed by a processor on a computer system, the instructions perform a method for secure multicloud validation.

The method may include receiving a natural language request for a cloud-based test scenario. The request may include a cloud resource and a cloud platform.

The method may include, using a machine learning model, mapping keywords extracted from the request to a test case associated with the cloud resource and a configuration file associated with the cloud platform.

The method may include retrieving a shell script associated with the test case. The method may include, based on the configuration file, accessing the cloud platform via a secure gateway. The security level applied may be determined based on the test case and/or the cloud platform.

The method may include executing the shell script using data from the cloud platform and generating a summary report including execution results for the test scenario.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for multicloud validation as detailed herein.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCS, minicomputers, mainframe computers, distributed computing environments that include any of the above systems or devices, and the like.

Figure 2:
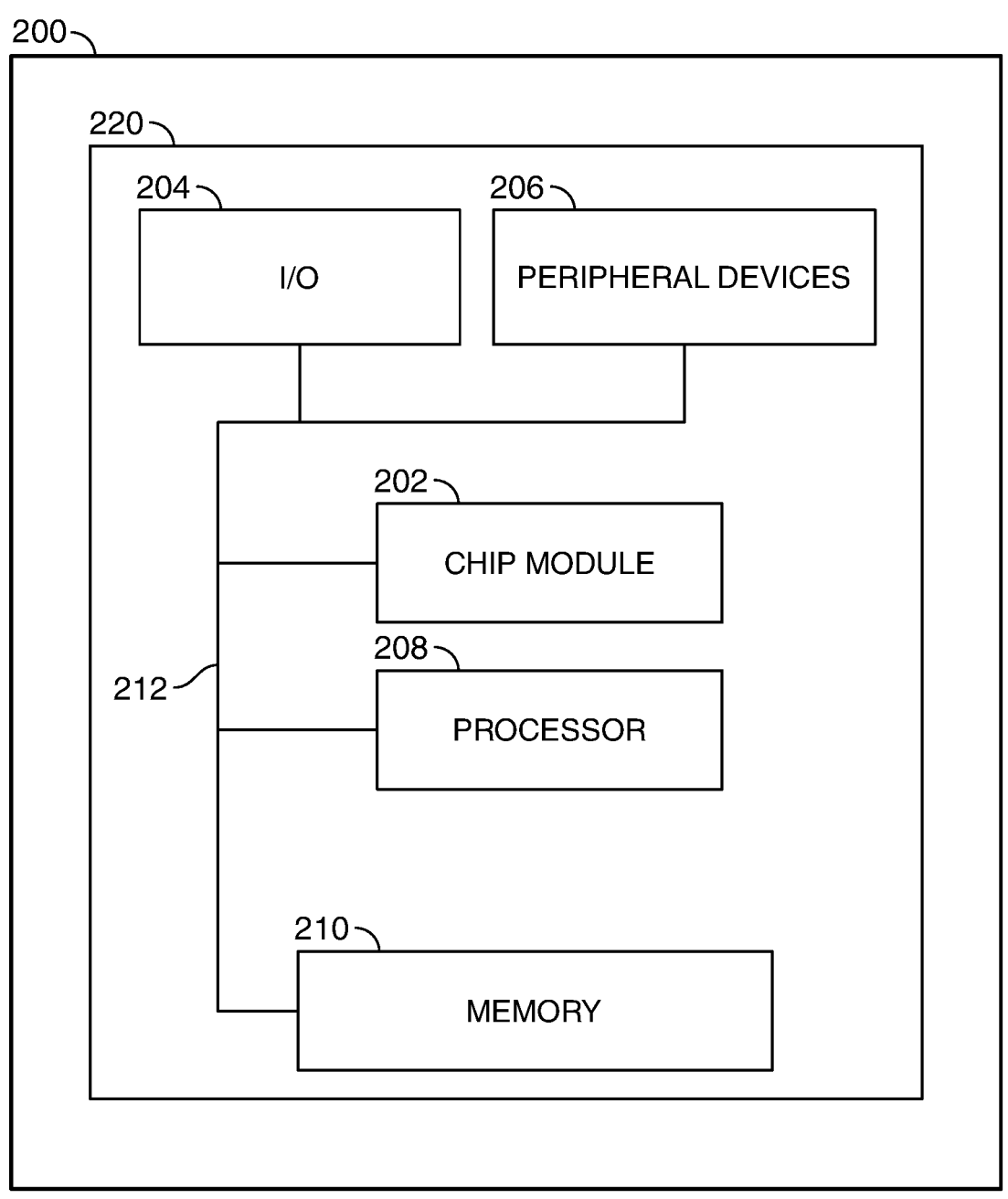
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
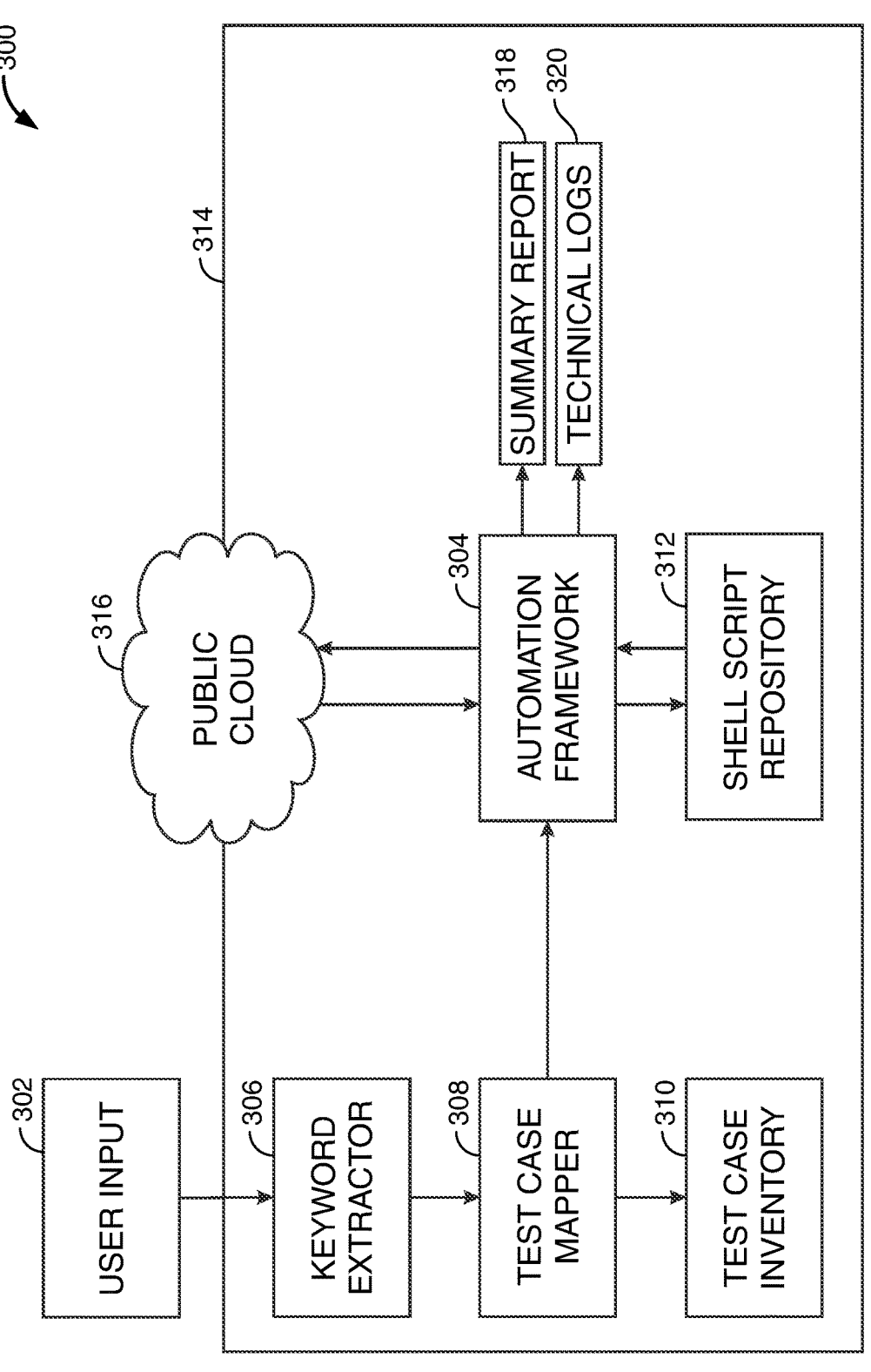
FIG. 3 shows illustrative system architecture in accordance with principles of the disclosure.

FIG. 3 shows illustrative system architecture 300 for a multicloud automation framework. The system may receive user input 302. The system may receive the input at a user interface. The input may be a natural language test scenario. Automation framework 304 may execute the testing based on the test scenario.

The system may include natural language processing. Keyword extractor 306 may use named entity recognition or any suitable machine learning algorithm to extract keywords from the test scenario. Testcase mapper 308 may map the keywords to test cases selected from test case inventory 310.

Automation framework 304 may use the test cases to identify shell scripts for executing the test case. Automation framework 304 may retrieve the shell scripts from shell script repository 312.

Automation framework 304 may access public cloud 316 to execute the shell scripts. The system may use a secure gateway to connect enterprise network 314 to public cloud 316. Public cloud 316 may be associated with a cloud provider. In a multicloud system, keywords extracted from the test scenario may identify a cloud provider. Automation framework 304 may select and read a configuration file associated with the cloud provider. The configuration file may include routing and authentication information for accessing the secure gateway and connecting public cloud 316.

Automation framework 304 may generate summary report 318 for each test executed in public cloud 316. Automation framework 304 may also maintain technical logs 320 showing the results returned for execution of each shell script.

Figure 4:
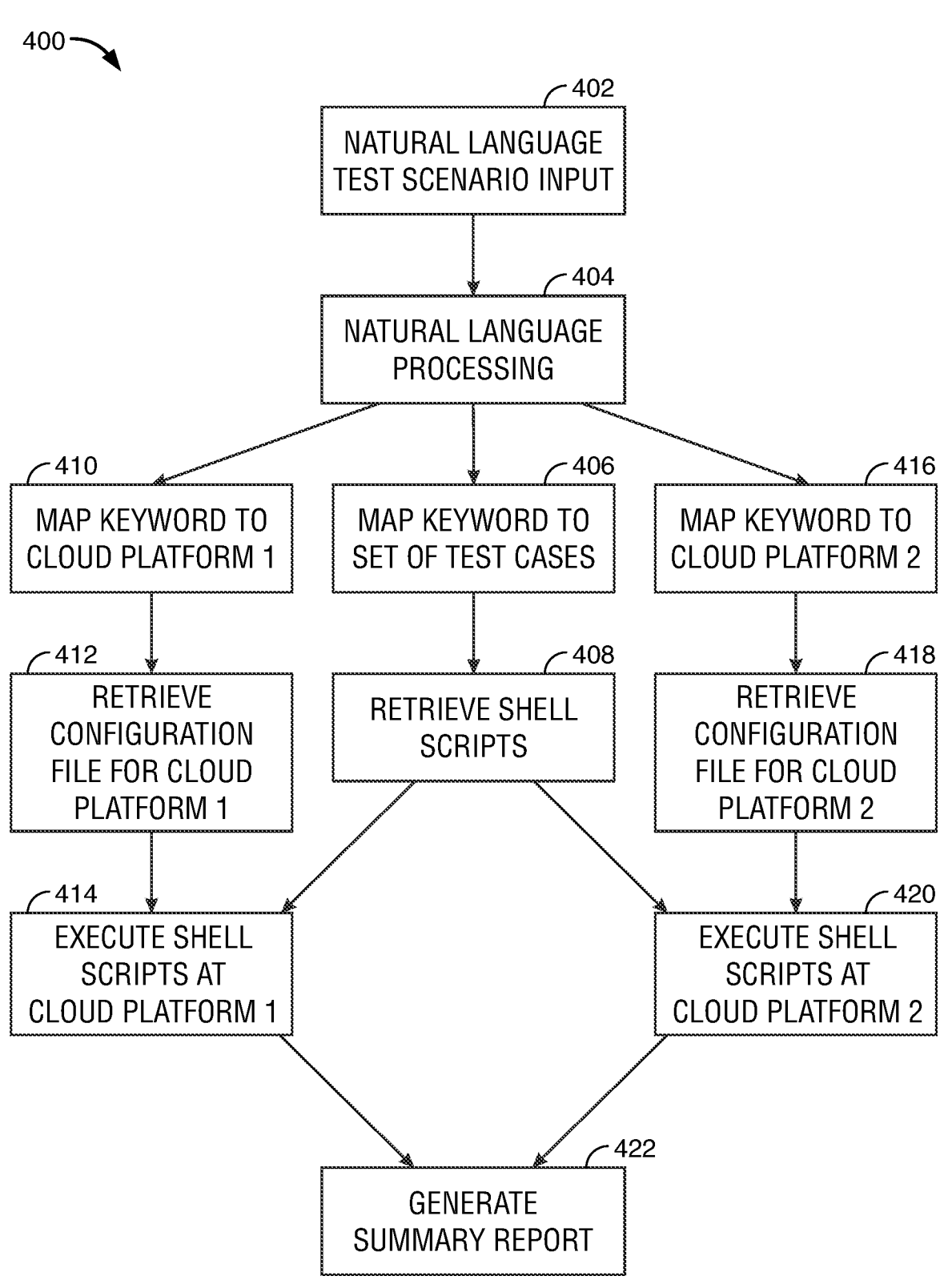
FIG. 4 shows an illustrative process flow in accordance with principles of the disclosure.

FIG. 4 shows illustrative process flow 400 for a multicloud test automation framework. At step 402, the framework receives input of a natural language test scenario. At step 404, natural language processing tokenizes and analyzes the input. The framework may include both extraction and mapping algorithms.

At step 406, keywords from the test scenario are mapped to a set of test cases. At step 408, the framework retrieves shell scripts specified by the test cases.

The test scenario may specify one or more cloud platforms for the test. At step 410, keywords from the test scenario are mapped to a first cloud platform. At step 412, the framework retrieves and reads a configuration file associated with the first cloud platform. At step 414, the framework may use data from the configuration file to access the first cloud platform and execute the shell scripts.

At step 416, keywords from the test scenario are mapped to a second cloud platform. At step 418, the framework retrieves and reads a configuration file associated with the second cloud platform. At step 420, the framework may use data from the configuration file to access the second cloud platform and execute the shell scripts.

At step 422, the framework may generate a summary report with the test results. The summary report may provide a comprehensive and easily understandable response to the natural language test scenario. The summary report may be a consolidated report that integrates test results from multiple cloud platforms. The framework may also generate technical logs showing line-by-line of the scripts.

Thus, methods and apparatus for a MULTICLOUD TEST AUTOMATION FRAMEWORK are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for secure multicloud validation, the method comprising:

receiving a natural language request for a cloud-based test scenario, the request comprising a cloud resource and a cloud platform;

using a machine learning model, mapping keywords extracted from the test scenario to a test case associated with the cloud resource and a configuration file associated with the cloud platform, the configuration file selected from a set of configuration files each associated with a cloud platform and comprising:

a cloud service access point comprising a secure gateway;

an encrypted security key; and a security level for the test case and security levels for each test case in a set of test cases;

retrieving a pre-coded shell script associated with the test case from a shell script repository;

based on the configuration file:

tuning the secure gateway to the security level for the test case and the cloud platform, the tuning comprising adjusting a connection parameter for the secure gateway; and accessing the cloud platform via the secure gateway;

executing the shell script using data from the cloud platform; and generating a summary report comprising execution results for the shell script.

2. The media of claim 1, wherein the cloud resource is a first cloud resource, the cloud platform is a first cloud platform, the test case is a first test case, the shell script is a first shell script, and the secure gateway is a first secure gateway, the method further comprising:

using the machine learning model, mapping keywords extracted from the test scenario to a second test case associated with a second cloud resource and a second configuration file associated with a second cloud platform;

retrieving a second shell script associated with the second test case;

based on the second configuration file, accessing the second cloud platform via a second secure gateway;

executing the second shell script using data from the second cloud platform; and generating a summary report comprising execution results for execution of the first shell script and the second shell script.

3. The media of claim 1, the summary report comprising a test case name, a test case description, an execution status, an error log, a test duration, an execution date, and a test environment.

4. The media of claim 1, the method further comprising compiling a technical log for execution of the shell script.

5. The media of claim 1, the method further comprising using tokenization to extract a keyword from the test scenario and iterating through a natural language processing library to map a token to the cloud resource.

6. The media of claim 1, wherein the cloud platform is a public cloud platform comprising a private connection.

7. A system for a secure multicloud validation framework comprising a processor configured to:

receive a natural language cloud-based test scenario, the test scenario comprising a cloud resource and a cloud platform;

using a machine learning model, map keywords extracted from the test scenario to a test case associated with the cloud resource and a configuration file associated with the cloud platform, the configuration file comprising:

a cloud service access point comprising a secure gateway;

an encrypted security key; and a security level for the test case and security levels for each test case in a set of test cases;

retrieve a pre-coded shell script associated with the test case from a shell script repository;

based on the configuration file:

tune the secure gateway to the security level for the test case and the cloud platform, the tuning comprising adjusting a connection parameter for the secure gateway; and access the cloud platform via the secure gateway;

execute the shell script using data from the cloud platform; and generate a summary report for execution of the shell script.

8. The system of claim 7, wherein the cloud resource is a first cloud resource, the cloud platform is a first cloud platform, the test case is a first test case, the shell script is a first shell script, and the secure gateway is a first secure gateway, the processor further configured to:

using the machine learning model, map keywords extracted from the test scenario to a second test case associated with a second cloud resource and a second configuration file associated with a second cloud platform;

retrieve a second shell script associated with the second test case;

based on the second configuration file, access the second cloud platform via a second secure gateway;

execute the second shell script using data from the second cloud platform; and generate a summary report for execution of the second shell script.

9. The system of claim 7, further comprising a router proprietary to the cloud platform, the processor configured to route the shell script to the router based on the configuration file.

10. The system of claim 7, further comprising a user interface configured to receive input of a natural language test scenario.

11. The system of claim 7, the summary report comprising a test case name, a test case description, an execution status, an error log, a test duration, an execution date, and a test environment.

12. The system of claim 7, the processor further configured to compile a technical log for execution of the shell script.

13. The system of claim 7, the processor further configured to use tokenization to extract a keyword from the natural language test scenario and iterate through a natural language processing library to map a token to the cloud resource.

14. A method for a secure multicloud validation framework comprising non-transitory computer-executable instructions that when executed by a processor:

receive a natural language request for a cloud-based test scenario, the request comprising a cloud resource and a cloud platform;

using a machine learning model:

map a first keyword extracted from the request to a test case associated with the cloud resource; and map a second keyword extracted from the request to a configuration file associated with the cloud platform, the configuration file comprising:

a cloud service access point comprising a secure gateway;

an encrypted security key; and a security level for the test case, the security level variable based on a test case;

retrieve a pre-coded shell script associated with the test case from a shell script repository;

based on the configuration file:

tune the security gateway to the security level for the test case and the cloud platform, the tuning comprising adjusting a connection parameter for the secure gateway; and access the cloud platform via the secure gateway;

execute the shell script using data from the cloud platform; and generate a summary report for execution of the shell script.

15. The method of claim 14, wherein the cloud resource is a first cloud resource, the cloud platform is a first cloud platform, the test case is a first test case, the shell script is a first shell script, and the secure gateway is a first secure gateway, the processor further configured to:

using the machine learning model, map keywords extracted from the request to a second test case associated with a second cloud resource and a second configuration file associated with a second cloud platform;

retrieve a second shell script associated with the second test case;

based on the second configuration file, access the second cloud platform via a second secure gateway;

execute the second shell script using data from the second cloud platform; and generate a summary report for execution of the first shell script and the second shell script.

16. The method of claim 14, further comprising adapting the framework for an additional cloud platform by providing access to an additional configuration file.

17. The method of claim 14, the configuration file comprising a cloud service access point and an encrypted authentication key.

18. The method of claim 14, the summary report comprising a test case name, a test case description, an execution status, an error log, a test duration, an execution date, and a test environment.

19. The method of claim 14, further comprising, using tokenization to extract a keyword from the natural language request and iterating through a natural language processing library to map a token to the cloud resource.

* * * * *